March 9, 1926.

H. G. TATOSIAN

ICE CREAM CONE ROLLING MACHINE

Filed May 23, 1924     3 Sheets-Sheet 1

1,576,011

INVENTOR
Harry G. Tatosian
BY
Chamberlain & Newman
ATTORNEYS

March 9, 1926.

H. G. TATOSIAN 1,576,011

ICE CREAM CONE ROLLING MACHINE

Filed May 23, 1924

INVENTOR.
Harry G. Tatosian
BY
Chamberlain & Newman ATTORNEYS.

March 9, 1926.
H. G. TATOSIAN
1,576,011
ICE CREAM CONE ROLLING MACHINE
Filed May 23, 1924   3 Sheets-Sheet 3
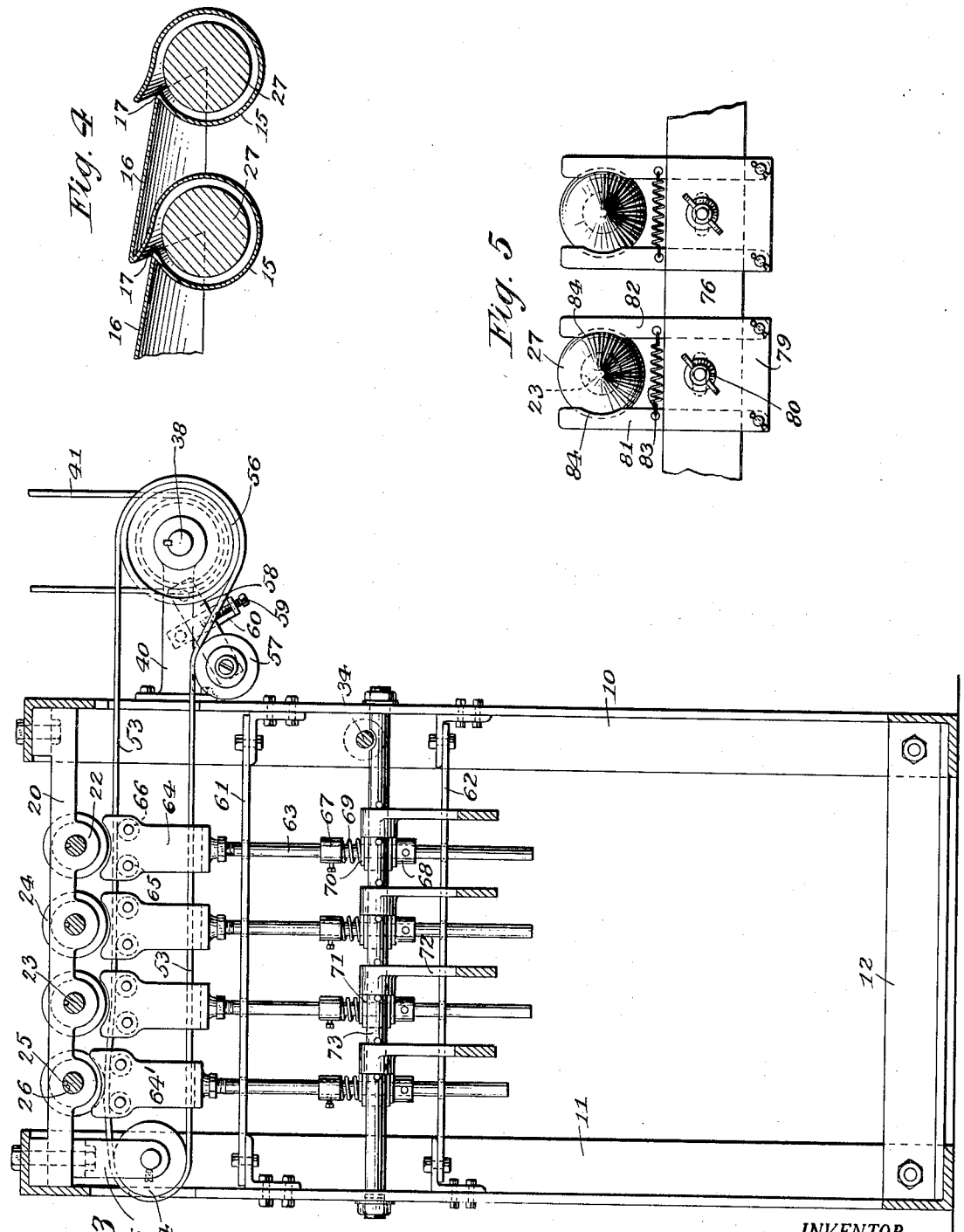
INVENTOR.
Harry G. Tatosian
BY
Chamberlain & Newman ATTORNEYS.

Patented Mar. 9, 1926.

1,576,011

UNITED STATES PATENT OFFICE.

HARRY G. TATOSIAN, OF BRIDGEPORT, CONNECTICUT, ASSIGNOR TO ICE CREAM CONE MACHINERY, INC., OF BRIDGEPORT, CONNECTICUT, A CORPORATION OF CONNECTICUT.

ICE-CREAM-CONE-ROLLING MACHINE.

Application filed May 23, 1924. Serial No. 715,283.

*To all whom it may concern:*

Be it known that I, HARRY G. TATOSIAN, a citizen of the United States, and resident of Bridgeport, in the county of Fairfield and State of Connecticut, have invented certain new and useful Improvements in Ice-Cream-Cone-Rolling Machines, of which the following is a specification.

This invention relates to an improved machine for rolling cones, such as are used for containing ice cream. An object of the invention is to provide a machine of this character for forming ice cream cones by rolling the same from baked pliable cakes, while the same are yet warm, the machine being adapted to be operated and used in conjunction with an improved type of cone cake baking machine, and having an increased number of spindles capable of caring for the increased product of the new baking machine.

A further object is to provide a cone rolling machine wherein the cones can be rolled from relatively soft pliable cakes, and the overlapping outer edges thereof can be pressed down against the bodies of the cones, and held sufficiently long to cause said edges and bodies to be sealed or united to produce cones which will not open up, but will maintain their proper shapes after being discharged from the machine. To this end it is proposed to provide improved driving means for the spindles which carry the cone forming mandrels, which will be positive in operation, and accurately timed, and by means of which the spindles are reciprocated to bring the mandrels into and out of relation with the cone molds, and rotated for a predetermined short period to roll the cones, and further to provide means which will hold the cones in the molds under pressure for a short period to seal their edges.

With the above and other objects in view, an embodiment of the invention is shown in the accompanying drawings, and this embodiment will be hereinafter more fully described with reference thereto, and the invention will be finally pointed out in the claims.

In the drawings:

Fig. 3 is a transverse vertical sectional view, taken along the line 3—3 of Fig. 1;

Fig. 4 is a detail sectional view of the cone molds, taken along the line 4—4 of Fig. 1; and Fig. 5 is a detail sectional view of the cone stripping means, taken along the line 5—5 of Fig. 1.

Similar reference characters indicate corresponding parts throughout the several figures of the drawings.

Figure 1:
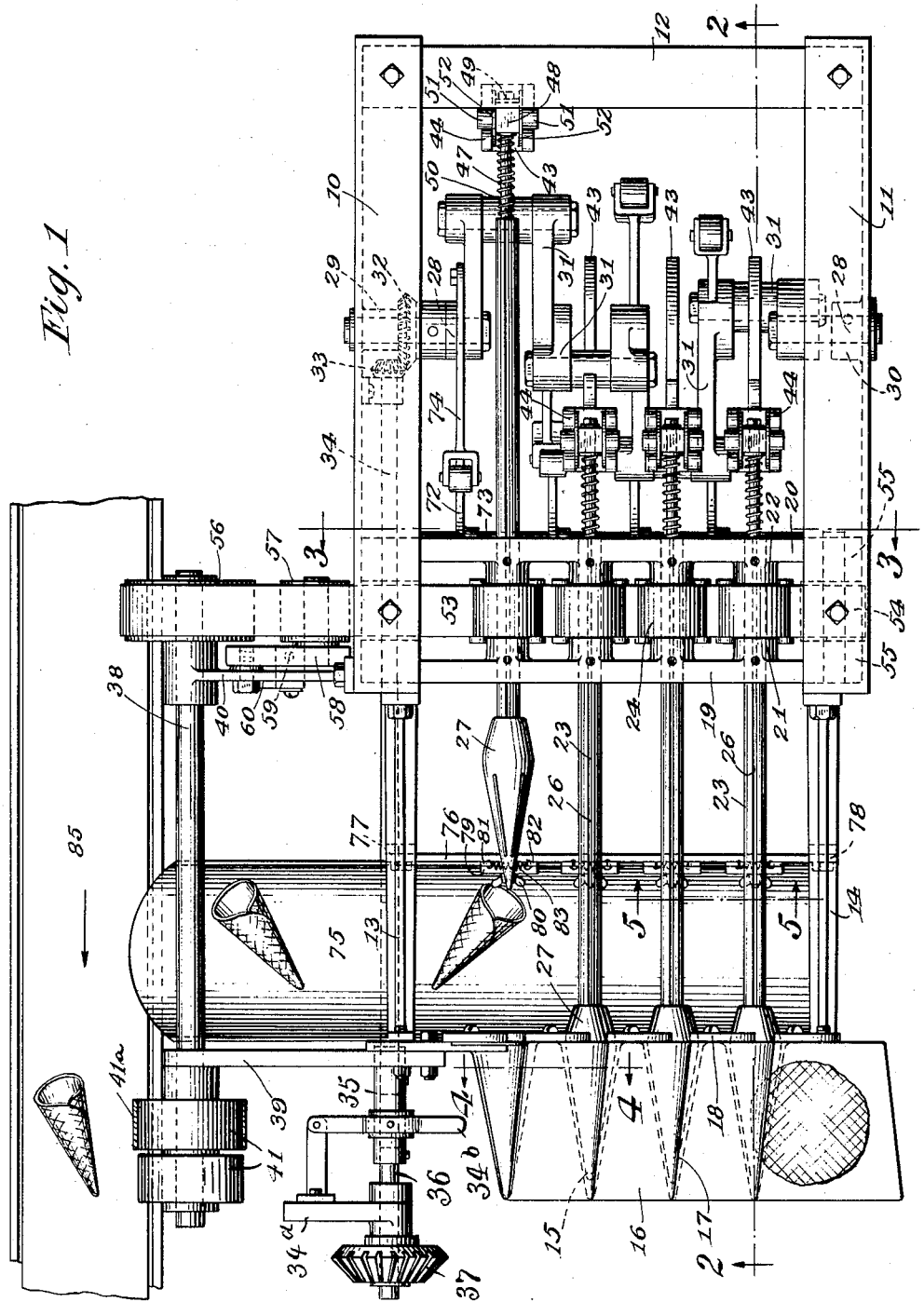
Fig. 1 is a plan view of the machine, according to the present embodiment of the invention.

Referring to the drawings, the frame of the machine comprises rectangular side frames 10 and 11 connected by angle bars 12, and having secured to their respective forward sides adjacent the upper ends a pair of forwardly projecting arms 13 and 14, and upon which the conical molds are supported. The molds are formed from a single piece of sheet metal bent to produce a series of spaced conical mold portions 15 and inclined flat feeding portions 16, these feeding portions extending to the entrance slots 17 of the mold portions, as shown clearly in Fig. 4. The feeding portions are substantially tangential to the inner periphery of the mold portions and the opposed wall of the slot is flared upwardly to guide the flat cakes into the mold, as clearly indicated in Fig. 1, where they are rolled into cone form by the rotation of the mandrels, as will hereinafter more fully appear. The cone molds are secured to an apertured plate 18 mounted at the forward ends of the arms 13 and 14.

Between the upper forward corners of the side frames 10 and 11 there are secured transverse spindle supports 19 and 20, spaced from each other and provided with a series of aligned bearings 21 and 22, in which the spindles 23 are slidably mounted, pulleys 24 being mounted upon said spindles between the bearings and keyed thereto by means of keys 25 engaging longitudinal key slots 26 of the spindles. At their forward ends the spindles are provided with cone-shaped mandrels 27 adapted as the spindles are reciprocated forwardly to enter the cone molds and be rotated therein to roll the cones.

The mechanism for reciprocating the spindles includes a crank-shaft 28 journaled at its ends in bearing portions 29 and 30 of the side frames, and provided with a series of angularly off-set crank portions 31 corresponding in number and placement to the spindles, there being four in the present embodiment. For the purpose of continuously driving the crank-shaft, the same is provided with a bevel gear 32 adjacent the side frame 10, which meshes with a bevel pinion 33 provided on one end of a drive shaft 34 journaled in the side frame. The opposite end of this shaft is connected by a clutch 35 with a short shaft 36 bearing a bevel gear 37 designed to mesh with and be driven by a gear of a baking machine, not shown, but with which my present invention is timed to operate. The short shaft 36 is journaled in a bracket 34$^a$ which may be secured to the baking machine. The clutch is operated by a hand lever 34$^b$, that is pivotally connected to an arm of the aforesaid bracket 34$^a$. A belt driven shaft 38 is journaled in bearings 39 and 40 secured respectively to the forward end of the arm 13 and the side frame 10, and is provided with tight and loose pulleys 41 that are driven by a belt 41$^a$ from any suitable source of power.

At the base of the frame there is mounted a transverse shaft 42, upon which a series of crank levers 43 are pivoted, the upper ends of said levers being forked, as at 44, for connection with the rear ends of the spindles, while intermediately each of the levers is provided with crank engaging cam portions comprising a substantially semicircular part 45 and a substantially straight part 46 extending upwardly from the lower end of the part 45 into spaced relation to the upper portion thereof. The rollered ends of the respective crank portions of the crank shaft move in relation to the inner surfaces of the cam portions to reciprocate the spindles into and out of engagement with the cone molds with relative rapidity, the mandrels remaining in engagement with the molds for a predetermined period, during part of which they are rotated to roll the cones, and then caused to dwell for a time and while further pressure is applied to seal their edges, as will hereinafter appear.

Figure 2:
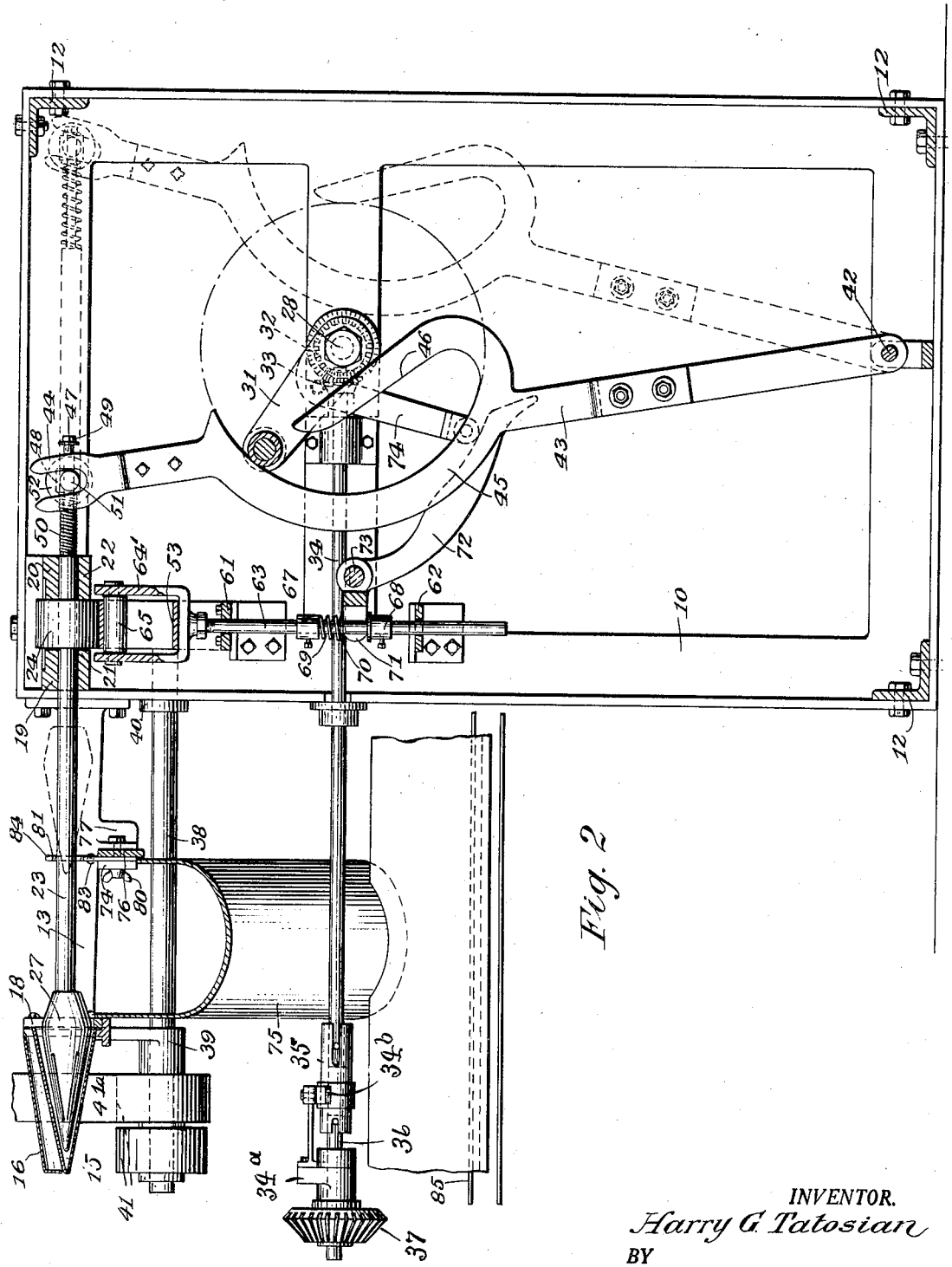
Fig. 2 is a vertical sectional view thereof, taken along the line 2—2 of Fig. 1.

The forked end of each of the crank levers is yieldably connected to its respective spindle, and for this purpose the latter is provided at its rear end with an extension rod 47 having a slide block 48 thereon normally pressed rearwardly against a stop nut 49 upon the end of the rod by means of a spring 50. The slide block is provided with projecting stud shaft portions 51 at each side and washers 52 for engagement with the forked end of the crank lever. This yielding connection permits the mandrels to engage the cone molds with cushioned contact, and causes the same to yieldably press the cones in the molds in the engaged position, as clearly indicated in Fig. 2.

The mechanism for intermittently rotating the spindles and mandrels to roll the cones is adapted to individually cooperate with the pulleys 24 through timed actuating means carried by the crank portions 31 of the crank shaft, and consists of a continuous belt 53 having its upper traverse disposed in normally spaced relation below said pulleys 24, and extending over a small roller 54 mounted in a bracket 55 hung from the under side of the supports 19 and 20, and a large pulley 56 mounted upon the end of the main drive shaft 38. An adjustable tightening roller 57 is mounted upon an arm 58 pivotally secured to the bracket 40, and is adapted to be engaged with the under side of the belt 53 with greater or less pressure by means of a set-screw 59 provided in a bracket arm 60.

Between the side frames there are transversely supported beneath the belt 53 a pair of apertured supports 61 and 62, in which vertical rods 63, aligned beneath the respective pulleys 24, are mounted for reciprocation, being provided at their upper ends with yokes 64 extending at the sides of the belt, and each having a pair of rollers 65 and 66 mounted therein and engaging the under side of the upper traverse of the belt. The rods 63 are provided between the supports with collars 67 and 68, beneath the upper of which is provided a coil spring 69 and a washer 70, the forked end 71 of a bell-crank lever 72, pivotally mounted on a transverse shaft 73 supported between the side frames, engaging about the rods between said washer 70 and the lower collar 68. The long arm of the lever 72 extends into the path of a rollered arm 74 secured upon its respective crank portion 31 of the crank shaft, so that as the crank shaft rotates, the respective arms 74 engage their respective bell-crank levers at predetermined points, swinging them and causing the vertical rods 63 to be raised to press the respective rollers 67 and 68 upwardly to engage the respective portions of the continuously moving belt with the pulleys 24, as seen at 64′, Figs. 2 and 3, to thereby rotate the spindles and mandrels.

It will be obvious that the crank portions are so arranged that the spindles are moved forwardly, one after the other, and that the spindle rotating mechanism is actuated for a short period after the mandrels are engaged with the cone molds to roll the cones, the mandrels then remaining stationary for a short period in the cone molds under the pressure of the springs 50, which are compressed at the completion of the forward stroke of the crank levers, to thereby press and seal the cones.

At the inner open ends of the cone molds there is provided an inclined chute 75 secured at the upper edge of its outer vertical side to the plate 18, and at the upper edge of its inner vertical side to a cross bar 76 mounted at its ends upon bracket portions 77 and 78 of the arms 13 and 14. The bar 76 also has mounted thereon a series of cone strippers, each comprising a slotted plate 79, secured for longitudinal adjustment upon the bar by a wing nut 80, and pivoted arms 81 and 82 connected by a spring 83 and provided at their inner edges with arcuate cutouts 84 adapted to be engaged by the mandrels as they are reciprocated to and fro, the spring 83 holding the stripper arms in yielding contact with the mandrel surface. As the spindles are reciprocated rearwardly with the cones engaged upon the mandrels, the same are stripped off by engagement of the stripper arms therewith and drop into the chute 75, along which they roll to a continuously moving conveyor 85, which carries them to a suitable point to be packed in boxes, or the like.

It will be obvious that the invention may be applied to machines having a greater or less number of spindles and molds, and also that other changes may be made therein, within the spirit and scope of the invention, as defined in the appended claims.

Having thus described the invention, what I claim and desire to secure by Letters Patent is:

1. In a cone making machine, the combination of a spindle having a conical mandrel, a conical mold, means for longitudinally shifting said mandrel into and out of engagement with said mold, continuously driven means for rotating said mandrel in said mold and normally out of operative relation therewith, and means adapted to individually and intermittently press said driven means into operative relation with said spindle to rotate the same.

2. In a cone making machine, the combination of a spindle having a conical mandrel, a conical mold, means for longitudinally shifting said mandrel into and out of engagement with said mold, a continuously driven belt for rotating said mandrel, normally out of operative relation therewith, and means adapted to intermittently press said belt into operative relation with said spindle to rotate the same.

3. In a cone making machine, the combination of a spindle having a conical mandrel, a conical mold, a crank lever connected to said spindle to reciprocate said mandrel longitudinally into and out of engagement with said mold, continuously driven crank means adapted to oscillate said lever, continuously driven belt means for rotating said mandrel, normally out of operative relation therewith, and means carried by said crank means adapted to intermittently move said last mentioned driven means into direct engagement with said spindle to rotate the same.

4. In a cone making machine, the combination of a spindle having a conical mandrel, a conical mold, means for longitudinally shifting said mandrel into and out of engagement with said mold, a continuously driven belt for rotating said mandrel, normally out of operative relation therewith, lifter means disposed beneath said belt adapted to be operated to relate said belt with said spindle to rotate the same, and means adapted to intermittently operate said lifter means.

5. In a cone making machine, the combination of a spindle having a conical mandrel, a conical mold, means for longitudinally shifting said mandrel into and out of engagement with said mold, a continuously driven belt for rotating said mandrel, normally out of operative relation therewith, lifter means disposed beneath said belt adapted to be operated to relate said belt with said spindle to rotate the same, and means movable with said spindle shifting means adapted to intermittently operate said lifter means.

6. In a cone making machine, the combination of a spindle having a conical mandrel, a conical mold, a crank lever connected to said spindle to reciprocate said mandrel longitudinally into and out of engagement with said mold, continuously driven crank means adapted to oscillate said lever, continuously driven means for rotating said mandrel, normally out of operative relation therewith, means adapted to be operated to relate said last mentioned continuously driven means with said spindle to rotate the same, and an arm carried by said crank means adapted to intermittently operate said last means.

7. In a cone making machine, the combination of a spindle having a conical mandrel, a conical mold, a crank lever connected to said spindle to reciprocate said mandrel longitudinally into and out of engagement with said mold, a continuously driven belt for rotating said mandrel, normally out of operative relation therewith, lifter means disposed beneath said belt adapted to be operated to relate said belt with said spindle to rotate the same, and an arm carried by said crank means adapted to intermittently operate said lifter means.

8. In a cone making machine, the combination of a spindle having a conical mandrel, a conical mold, a crank lever connected to said spindle to reciprocate said mandrel longitudinally into and out of engagement with said mold, and including a cam opening having a substantially semi-circular wall and a straight wall forming a continuation of one end of the substantially semi-circular wall and stopping short of the other end thereof, continuously driven crank means engaging said cam opening and adapted to oscillate said lever, continuously driven means for rotating said mandrel in said mold, normally out of operative relation therewith, and means adapted to intermittently relate said driven means with said spindle to rotate the same.

9. In a cone making machine, the combination of a plurality of spindles having conical mandrels, a plurality of conical molds, means for longitudinally shifting said mandrels into and out of engagement with said molds, continuously driven belt for individually and independently rotating said mandrels in said molds, and means adapted to individually and intermittently move said belt into engagement with said respective spindles to rotate the same.

10. In a cone making machine, the combination of a plurality of spindles having conical mandrels, a plurality of conical molds, individual crank levers connected to said respective spindles to reciprocate said mandrels into and out of engagement with said molds, continuously driven crank means adapted to oscillate said levers to shift said spindles one after the other, continuously driven belt intersecting said spindles for individually and independently rotating said mandrels in said molds, and means adapted to individually and intermittently move said belt into engagement with said respective spindles to rotate the same.

11. In a cone making machine, the combination of a plurality of spindles having conical mandrels, a plurality of conical molds, individual crank levers connected to said respective spindles to reciprocate said mandrels into and out of engagement with said molds, continuously driven crank means adapted to oscillate said levers to shift said spindles one after the other, continuously driven means for rotating said mandrels, normally out of operative relation therewith, and means carried by said crank means adapted to intermittently relate said driven means with said respective spindles to rotate the same individually and independently one after the other.

12. In a cone making machine, the combination of a plurality of spindles having conical mandrels, a plurality of conical molds, means for longitudinally shifting said mandrels into and out of engagement with said molds one after the other, a continuously driven belt beneath said spindles for rotating them individually and independently, and normally out of operative relation therewith, and means adapted to intermittently press portions of said belt into respective operative relation with said spindles to rotate the same.

13. In a cone making machine, the combination of a plurality of spindles having conical mandrels, a plurality of conical molds, continuously rotating means for longitudinally shifting said mandrels into and out of engagement with said molds one after the other, a continuously driven belt beneath said spindles for rotating them individually and independently, and normally out of operative relation therewith, and means carried by said first rotating means adapted to intermittently press portions of said belt into respective operative relation with said spindles to rotate the same.

14. In a molding machine, the combination of a plurality of spindles having mandrels, a plurality of molds, means for longitudinally shifting said mandrels into and out of engagement with said molds, a driven belt arranged transversely of said spindles and normally out of operative relation therewith, and means adapted to intermittently move said belt into respective operative relation with said spindles to rotate the same.

Signed at Bridgeport, in the county of Fairfield and State of Connecticut, this 22nd day of May, A. D., 1924.

HARRY G. TATOSIAN.